(12) United States Patent
Johnston et al.

(10) Patent No.: US 7,212,174 B2
(45) Date of Patent: May 1, 2007

(54) SYSTEMS AND METHODS FOR SHARING APPLICATION DATA IN A NETWORKED COMPUTING ENVIRONMENT

(75) Inventors: James S. Johnston, Lexington, KY (US); Mark S. Kressin, Lakeway, TX (US); William M. Quinn, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/875,615

(22) Filed: Jun. 24, 2004

(65) Prior Publication Data

US 2006/0012612 A1    Jan. 19, 2006

(51) Int. Cl.
*G09G 5/02* (2006.01)

(52) U.S. Cl. .................. 345/2.2; 345/2.1; 345/2.3; 345/1.1; 345/1.2; 345/1.3; 345/3.1; 345/3.2; 345/3.3; 345/3.4; 345/619; 345/581

(58) Field of Classification Search .................. None
See application file for complete search history.

(56) References Cited

U.S. PATENT DOCUMENTS

| | | | |
|---|---|---|---|
| 5,917,952 A * | 6/1999 | Noh | 358/3.07 |
| 6,559,855 B1 * | 5/2003 | Kawase et al. | 345/596 |
| 2001/0037366 A1 * | 11/2001 | Webb et al. | 709/204 |

* cited by examiner

*Primary Examiner*—Mark Zimmerman
*Assistant Examiner*—Jwalant Amin
(74) *Attorney, Agent, or Firm*—Rissman Jobse Hendricks & Oliverio, LLP

(57) ABSTRACT

A system and method for facilitating application sharing in a networked environment is provided. Specifically, the system divides a display area on a host computer into a plurality of regions, with each region comprised of a predetermined number of current pixels. The system then evaluates current pixels within a selected region and compares them to corresponding pixels stored in memory. If the system determines that the value of the current pixel differs from the value of the stored corresponding pixel, all pixels within the region are sent to a receiving computer via a network. The receiving computer inserts the received region into a display such that it matches the display on the host computer from which the region originated.

10 Claims, 13 Drawing Sheets

| Region # | Updated | Changed Flag | Sent | Errors | Counter |
|---|---|---|---|---|---|
| 1 | 1 | 1 | 1 | | |
| 2 | 1 | 0 | 0 | | |
| 3 | 0 | 0 | 0 | | |
| 4 | 1 | 1 | 0 | | |
| 5 | 1 | 0 | 0 | | |
| 6 | 1 | 0 | 0 | | |
| 7 | 0 | 0 | 0 | | |
| 8 | 1 | 0 | 0 | | |
| 9 | 1 | 0 | 0 | | |
| 10 | 1 | 0 | 0 | | |
| 11 | 0 | 0 | 0 | | |
| 12 | 1 | 0 | 0 | | |

FIG. 9

SYSTEMS AND METHODS FOR SHARING APPLICATION DATA IN A NETWORKED COMPUTING ENVIRONMENT

BACKGROUND OF THE INVENTION

Proliferation of networked computers has helped facilitate growth of application-sharing technologies. Application sharing technologies allow geographically disparate users to share images, text and data in an essentially real-time manner. Real-time as used herein refers to synchronized computer-driven events running on two or more networked computers in such a manner that the synchronized events appear to be occurring at the same time to users co-located with the respective computers. Therefore, a real-time event can tolerate synchronization, transmission, and processing delays so long as a user cannot perceive them.

By way of example, an application-sharing environment may be as follows. A medical imaging system, such as a computer axial tomography (CAT) Scan, may generate local display images on a monitor within a hospital. A specialist located outside the hospital may want to view the images as they are generated in order to direct a technician running the imaging system. Ideally, the specialist should have real-time image updates such that the images on the specialist's monitor are appearing essentially at the same time as those on the technician's display so that the specialist can efficiently direct the technician.

Even with today's high bandwidth networks and powerful computing platforms, sharing images in application-sharing environments is problematic. One such problem arises because a typical modern computer image may consist of over a million pixels. In addition, a display on the remote computer should update at a rate sufficient to avoid perceptible screen flicker to a remote user.

Another problem arises because links connecting a host computer to a remote computer may not always consist of the fastest possible technologies. For example, a host sharing images with two remote sites may have to communicate over links of varying bandwidth. For example, the first remote computer may be connected to a high speed Gigabit Ethernet network, while the second remote user is connected by way of a much slower digital subscriber line (DSL) provided by a residential telecommunications provider.

There thus remains a need to improve application sharing technology and in particular sharing of images. A system that allows application sharing environments to operate in a real-time manner using networks and computers that heretofore impeded the sharing of image data is still desirable.

SUMMARY OF THE INVENTION

Systems and methods consistent with the present invention make it possible for networked applications to transfer image data in an efficient manner. Efficient use of network bandwidth is accomplished by having a host computer transfer only those portions of an image that change with respect to an initial, or baseline, image sent to a receiving computer over the network.

The system quickly and efficiently detects a change in an image on a host computer by employing methods that minimize the number of pixel comparisons required to detect changes within the image. In particular, the system efficiently selects a region containing pixels associated with a current image and compares it pixel-by-pixel to a corresponding region stored in memory. If the system determines that a value associated with a stored pixel differs from the value associated with a corresponding pixel in the currently displayed region then all pixels associated with the currently displayed region are sent over a network to a receiving computer. The system employs methods to facilitate these fast and efficient pixel-by-pixel comparisons. For example, a method may select a pixel that is located on the border of a region currently being examined. And, if that border pixel has changed value with respect to a corresponding stored pixel the method may cause the region containing the pixel to be sent over the network as well as causing the adjacent, or neighboring, region to be sent over the network. This approach may be desirable for applications where there is a likelihood that changes to border pixels span from one region to another. In other instances, the method may be configured so that it begins a pixel-by-pixel comparison within a displayed region at the outer edges of the region and spirals inward in one pixel increments with each successive pass. In still other instances, the method may skip one or more pixels such that adjacent pixels are not compared with their stored counterparts. Employing methods where one or more pixels are skipped further increases the operational speed of the system. In addition, a region may be designated for searching based on the likelihood that it contains a changed pixel thus increasing the chances that a changed region will be located at the earliest stages of a search. Additional region definition and pixel search strategies may be selected so as to minimize the required number of pixel comparisons. As will be seen below, embodiments of the invention facilitate fast and efficient pixel-by-pixel comparisons for displayed images by minimizing the number of computations required to identify changed pixels. In addition, embodiments of the invention greatly reduce the computational load on the CPU of the host computer because only a subset of the display area pixels, e.g. only pixels within a region, are processed.

In accordance with a preferred embodiment, the method for sharing an application operating on a host computer with a receiving computer which is operatively coupled to a network on which the host computer is operating is provided. A display area on the host computer is made up of a plurality of pixels each having a value associated therewith. The display area is parsed into two or more regions thus producing a divided display area. Each region of the divided display area contains a subset of the pixels making up the display area. A comparison is made to determine if members of the subsets of the plurality of pixels making up the display area differ from values associated with stored pixels representing an earlier image that was presented on the display. If it is determined that a pixel contained in one of the subsets of pixels making up the display area differs in value from the value of its corresponding stored pixel, an action is performed. An example of an action that may be performed is, but is not limited to, transmitting all pixels contained within the subset of the display area that contains the pixel having a changed value. Use of the above method makes it possible to reduce usage of network bandwidth because only those portions of a display that have changed value with respect to an image already transmitted to a receiving computer are sent over the network.

In accordance with another aspect of the present invention, a method for evaluating a plurality of pixels contained within a region of a display is provided. The region has a plurality of borders associated with it and each of the borders is capable of touching, or being adjacent to, another region contained within the display. The display used in the method operates in a networked application sharing environment so that it can send display data to other computers operating on the network. The method determines a pixel population that accounts for the presence and location of each of the pixels contained within the region. The method then accepts a criterion that is used to identify a processing sequence. The processing sequence is capable of adaptively skipping variable numbers of adjacent pixels when processing those pixels contained within the region of the display.

In accordance with another aspect of the present invention, a method for receiving an image update from a host computer in an application sharing environment is provided. The receiving computer receives a region layout index, typically from the host computer. The region layout index is used by the receiving computer to process image segments received from the host computer. Then the receiving computer receives a baseline image containing a plurality of regions, with each region containing a plurality of pixels. The baseline data is rendered on a display at the receiving computer. Then the receiving computer receives one or more updated regions over the network from the host computer. The updated regions are inserted into the baseline data display using the region layout index. The updated regions are displayed along with non-updated portions of the baseline display on the display device at the receiving computer.

In accordance with still another aspect of the invention, an apparatus for sharing an application over a network is provided. The apparatus includes an interface for sending updated display region to a receiving computer using the network. The apparatus also includes a memory for storing a baseline display that includes a first plurality, or group, of pixels. The memory also stores an updated display consisting of a second plurality, or group, of pixels equal in number to the first plurality. In addition, the memory stores a region layout index which is used to parse the baseline display into a first plurality of regions and to parse the updated display into a second plurality of regions while at the same time allowing respective ones of both the first and second pluralities of regions to be compared to each other. The apparatus also includes a display device for displaying the baseline display and the updated display. In addition, the apparatus includes a processor which is used facilitate displaying the baseline display on the display device prior to storing it in the memory. The processor also uses the region layout index to parse the baseline display and to parse and display the updated display. The processor is also used to process a pixel contained in one of the second plurality of regions which produces a processed pixel. The processed pixel is compared to one of the first plurality of pixels located within one of the first plurality of regions associated with the one of said second plurality of regions containing the processed pixel, and for sending the region to the receiving computer if the processed pixel differs from one of said first plurality of pixels.

In still another aspect of the invention, A method for sharing an application operating on a host computer operatively coupled to a network is provided. A display area is parsed into two or more regions to produce a divided display area. Then the divided display area is applied to a first display containing a plurality of pixels, each having a value associated therewith. Application of the divided display area also produces two or more display regions with each containing a subset of the plurality of pixels. These display regions are stored in a memory associated with the host computer. Next, an updated display is loaded into the host computer. The updated display contains the same number of pixels that were present in the display that was stored in memory. Each pixel of the updated display also has a value associated with it. The divided display area is applied to the updated display to produce two or more updated display regions each containing a subset of the plurality of pixels contained therein. The regions of the updated display are able to be associated with their counterpart regions contained in the stored display regions. One of the updated display regions is then selected to produce a selected region. This selected region is processed to determine if a value associated with one of the pixels contained therein differs from its corresponding pixel stored in memory. If the values of the two compared pixels differ, an action is performed.

The foregoing and other features and advantages of the system and method for sharing application data in a networked computing environment will be apparent from the following more particular description of preferred embodiments of the system and method as illustrated in the accompanying drawings in which like reference characters refer to the same parts throughout the different views.

BRIEF DESCRIPTION OF THE DRAWINGS

FIG. 9 illustrates an exemplary computer-readable data structure capable of storing information associated with application-sharing environments in accordance with aspects of the invention.

DETAILED DESCRIPTION OF THE INVENTION

Figure 1:
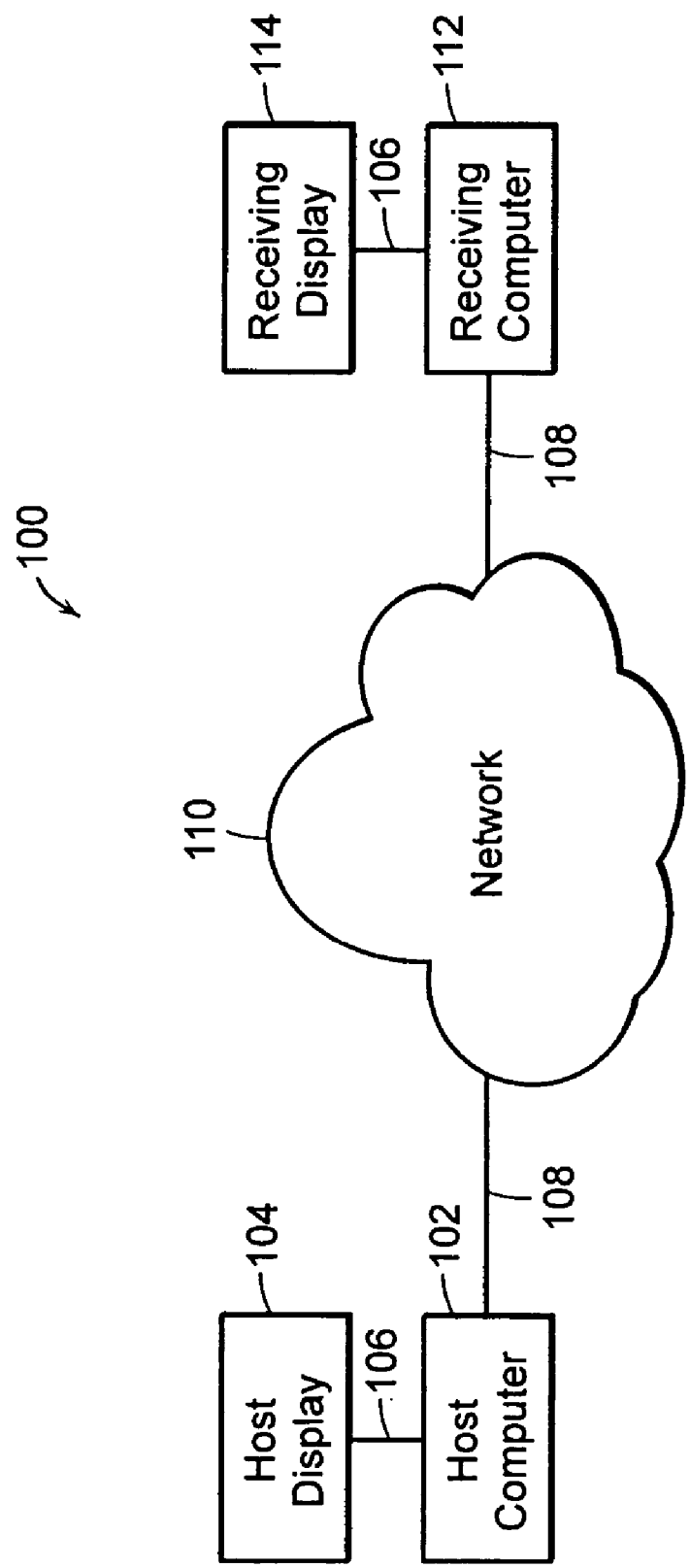
FIG. 1 illustrates an exemplary system for performing application sharing in accordance with aspects of the invention.

The invention as described herein facilitates application sharing over a communications network as shown in FIG. 1. The system 100 employs machine-executable code for efficiently selecting the best region within a display area for evaluation. When a region is selected, one or more pixels within the region are examined using one of a variety of methods designed to quickly determine if the values of the displayed pixels have changed with respect to corresponding pixels associated with a baseline region stored in a memory.

FIG. 1 illustrates an exemplary system 100 that includes a host computer 102, a host display 104, a cable 106, a network 110, a receiving computer 112, and a receiving display 114.

Host computer 102 acts as the originating apparatus for images that will be sent to receiving computer 112 over network 110. Host computer 102 and receiving computer 112, collectively, the computers, may be comprised of any device having a processor and capable of executing machine-readable instructions. For example, the computers may be comprised of a desktop personal computer (PC), a laptop computer, a server, a personal digital assistant (PDA), a web-enabled cell phone, and the like.

Host display 104 is used for rendering a local image proximate to host computer 102. Host display 104 may be communicatively coupled to host computer 102 by cable 106. Cable 106 may comprise rigid or semi-rigid electrical conductors for carrying power and/or data signals between host computer 102 and host display 104 Additionally, cable 106 may be comprised of optical fibers, free space optical links or radio frequency (RF) links capable of carrying machine-readable data signals. Links 108 carry data signals, or transmissions, between host computer 102 and receiving computer 112 using network 110. Links 108 may be hard-wired, such as coaxial cable, twisted pair cable, optical fiber, etc., or may be wireless, such as RF links, free space optical links, etc.

Network 110 may be comprised of any type of analog or digital network running any type of network protocol, such as, for example, synchronous optical transport network (SONET), asynchronous transfer mode (ATM), internet protocol (IP), frame relay, plain old telephone system (POTS), and the like.

Receiving computer 112 receives shared image data via network 110 in accordance with the invention. Receiving display 114 renders the received image to a remote user located therewith.

Preferred embodiments of the present invention utilize processing power and network bandwidth efficiently by only transmitting image data from host computer 102 to receiving computer 112 when that data has changed. By way of example, if an initial, or baseline, image including, for example, 1024×2048 pixels has been sent from host computer 102 to receiving computer 112, an update of that image may only contain a subset of the entire pixel set. For instance, an update to the initial display may only involve a 110×100 block of contiguous pixels located within a portion of the 1024×2048 total area of the image. Sending all 1024×2048 pixels to receiving computer 112 is inefficient because a large percentage of the transmitted pixels may not have changed value, i.e. been updated on host computer 102. The preferred embodiment of the present invention solves this problem by comparing the pixels in the initial image with those of the updated image. If pixels have changed, only those pixels along with pixels proximate thereto, are sent to receiving computer 112. Receiving computer 112 then generates a new display image consisting of the unchanged pixels in the initial image and the changed pixels just received. Details of the technique described above are provided hereinbelow. System throughput is dramatically improved because a smaller number of pixels are processed and transmitted over network 110.

Figure 2A:
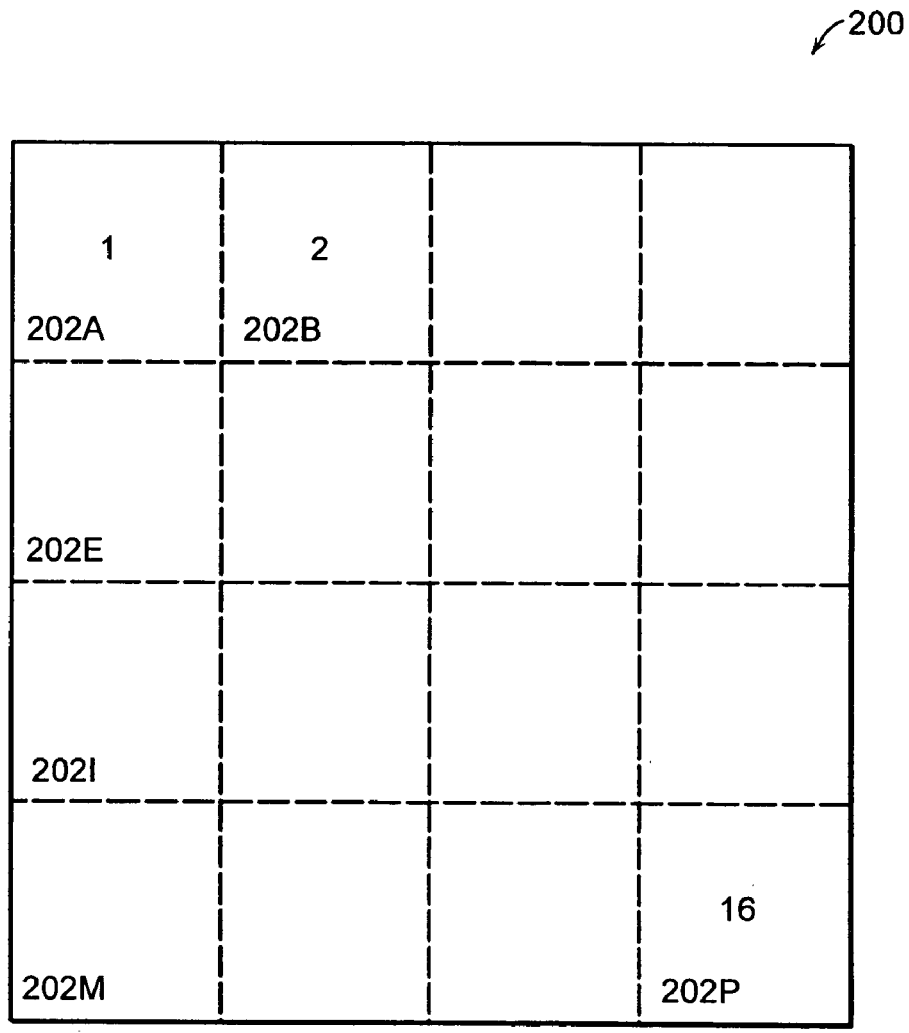
FIGS. 2A–2B illustrate exemplary display areas that include regions in accordance with aspects of the invention.

FIG. 2A illustrates an exemplary display area 200 used in connection with host display 104. In a preferred embodiment of the invention, host computer 102 executes machine-readable instructions that in turn divide display area 200 into a plurality of regions 202A–202P. In most embodiments, display area 200 will be divided into some number of equally sized regions. By way of example, display area 200 may be divided into 16 regions each having a predefined area of, say, 100 pixels wide and 100 pixels high. Although 16 regions have been used in the example, the invention is not limited thereto. In fact, any number of regions may be used. Furthermore, determining the number of regions to process may be dependent on factors such as the type of information displayed, frequency of updates, number of pixels within a display area, network bandwidth, and the like. In addition, the selection of the number of regions as well as the first region to process will typically be determined using operating parameters of the system as well as the type of data to be displayed. Using adaptive methods such as these for the selection of parsing and processing parameters facilitates high system throughput because changed pixels, if any, will be located early on in the method.

Figure 2B:
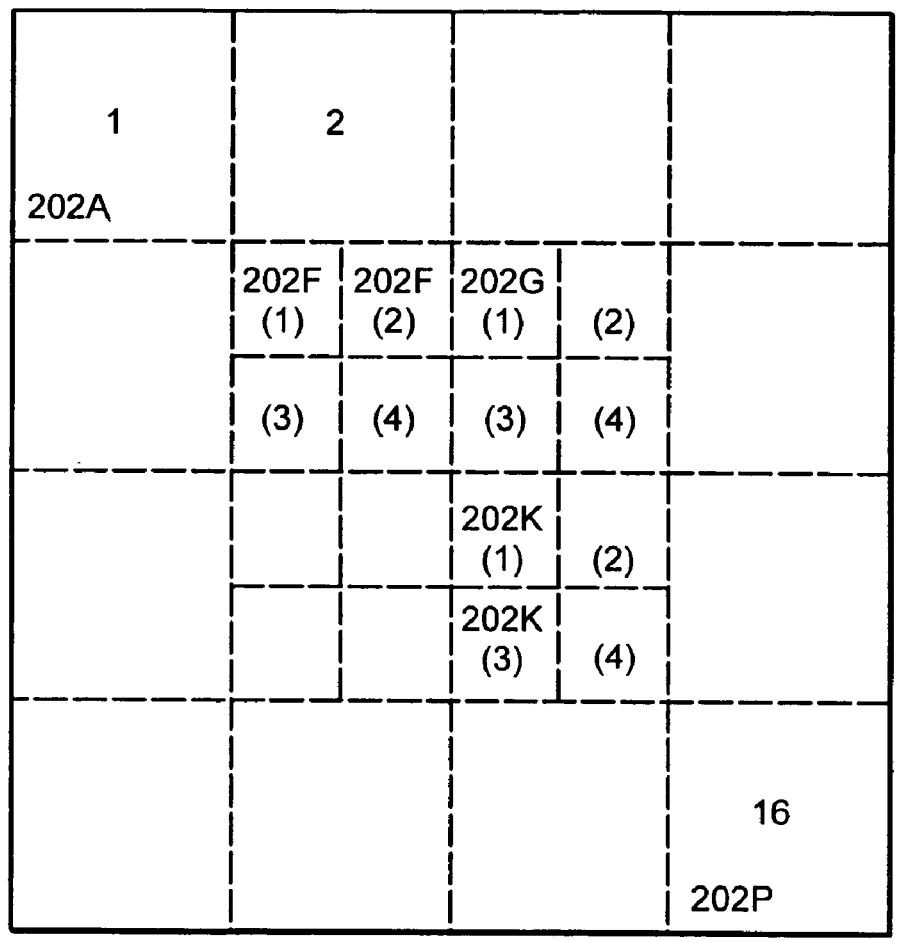

FIG. 2B illustrates an alternative embodiment of a display area 201 having a subset of the regions further divided into sub-regions. In particular, regions 202F, G, J, and K are each subdivided into four equally sized sub-regions, 202F(1-4), 202G(1-4), 202J(1-4) and 202K(1-4), with each sub-region containing one-quarter of the pixels located within the respective region. An alternative embodiment, such as that shown in FIG. 2B, may be useful in applications where only a portion of display area 201 changes on a regular basis. By further subdividing regions proximate to regularly changing pixels, the amount of display data transmitted from host computer 102 to receiving computer 112 can be further reduced as compared to that of the embodiment shown in FIG. 2A.

In still a further alternative embodiment display area 201 may be divided into regions 202 of varying size without using sub-regions. Such an embodiment may be desirable when a typical display is likely to contain changed pixels within a confined area of the display. In such a situation, it may be desirable to have smaller regions in the vicinity of expected changes to the pixels while using larger regions in areas of the display not expected to have frequently changing pixels. As can be seen, the number and size of regions 202 is not constrained.

Figure 3A:
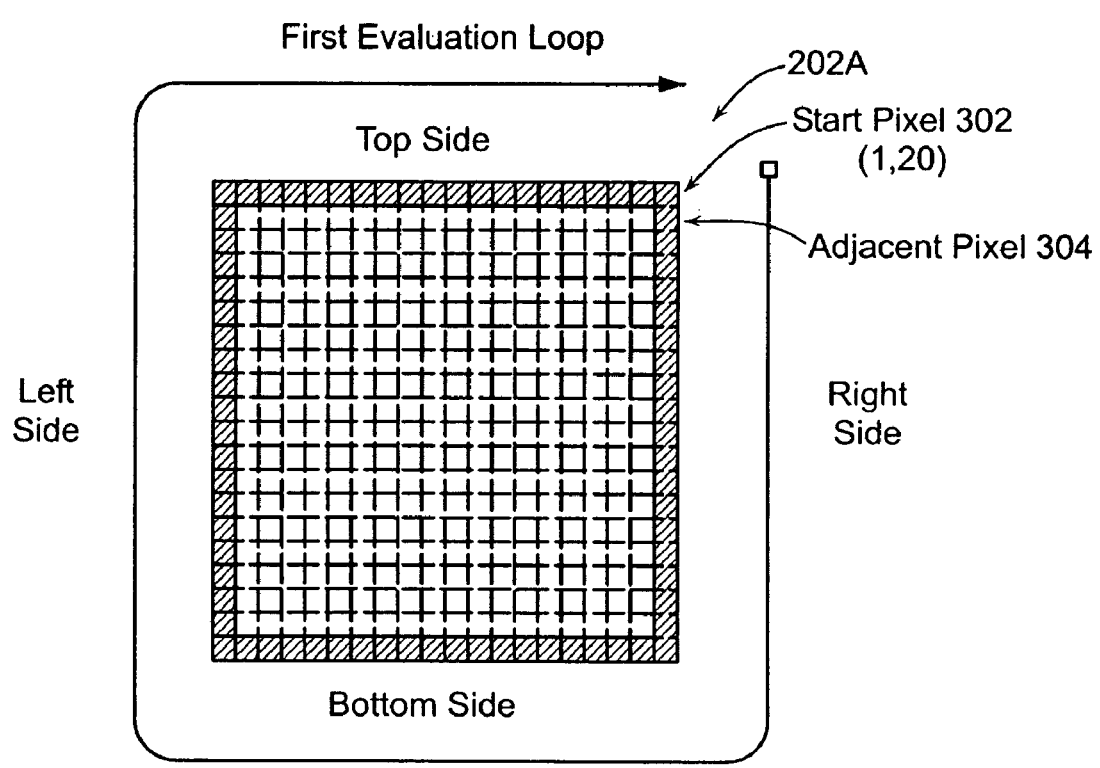
FIGS. 3A–3C illustrate aspects of an exemplary method for evaluating pixels within a region in accordance with a preferred embodiment of the invention.

FIG. 3A illustrates an exemplary method for evaluating pixels comprising a region, such as region 202A. The embodiment of region 202A shown in FIG. 3A is comprised of 400 pixels arranged in a 20×20 grid. Each pixel may have a unique identifier such as a number or geographic coordinate which in turn is used when performing pixel-by-pixel comparison operations and when updating display area 200.

Prior to evaluating pixels as shown in FIG. 3A, a complete version of display area 200 is stored in a computer-readable memory. This initial version of display area 200 is referred to as the baseline display. In a preferred embodiment, the baseline display contains every pixel making up display area 200. After the baseline display is stored, display area 200 is updated. The updated display may contain new values for every pixel comprising display area 200 or it may contain new values for only a subset of the pixels making up display area 200.

In a preferred embodiment, a pixel located in an outer corner of a region 202, referred to as start pixel 302, is selected. Since region 202A is located in the extreme upper left corner of display area 200 (FIG. 2B), it may be desirable to select an outer corner pixel that is also adjacent to one or more pixels located within another region such as 202B. Choosing a corner pixel bordering another region may increase the likelihood that updated pixels will be encountered. In fact, specific methods can be employed for optimizing system performance by making use of adjacent pixels. When the method begins the current, or updated, value of start pixel 302 is compared to the stored baseline value of start pixel 302 using host computer 102. If the current value of start pixel 302 has changed as compared to the baseline value, a region-changed flag is set in memory. The region-changed flag denotes that at least one pixel within a respective region, here 202A, has been updated. In a preferred embodiment of the invention, all pixels comprising a region are transmitted to the receiving computer 112 whenever a pixel within that region has been updated.

If the current value of start pixel 302 is the same as its baseline value, an adjacent pixel 304 along the outer edge of region 202A is then evaluated. When adjacent pixel 304 is evaluated, its current value is compared to its stored baseline value. If the current value and baseline value differ, the region-changed flag is set. In contrast, if the current value and baseline value for adjacent pixel 304 are the same, the next adjacent pixel along the outer edge is evaluated as described hereinabove.

In FIG. 3A, all pixels along the right side of region 202A are evaluated from top to bottom. If no changes are detected between the current values and baseline values for the respective pixels, the pixels along the outer edge of the bottom side are evaluated from right to left. If no changed pixels are detected along the bottom side, the outer edge pixels along the left side are evaluated from bottom to top. The evaluation process continues in a clockwise direction along the outer edge of region 202A until a changed pixel is detected. Whenever a changed pixel is detected, the region-changed flag is set and an adjacent region is then checked beginning with an outer corner pixel and continuing in a clockwise direction.

Figure 3C:
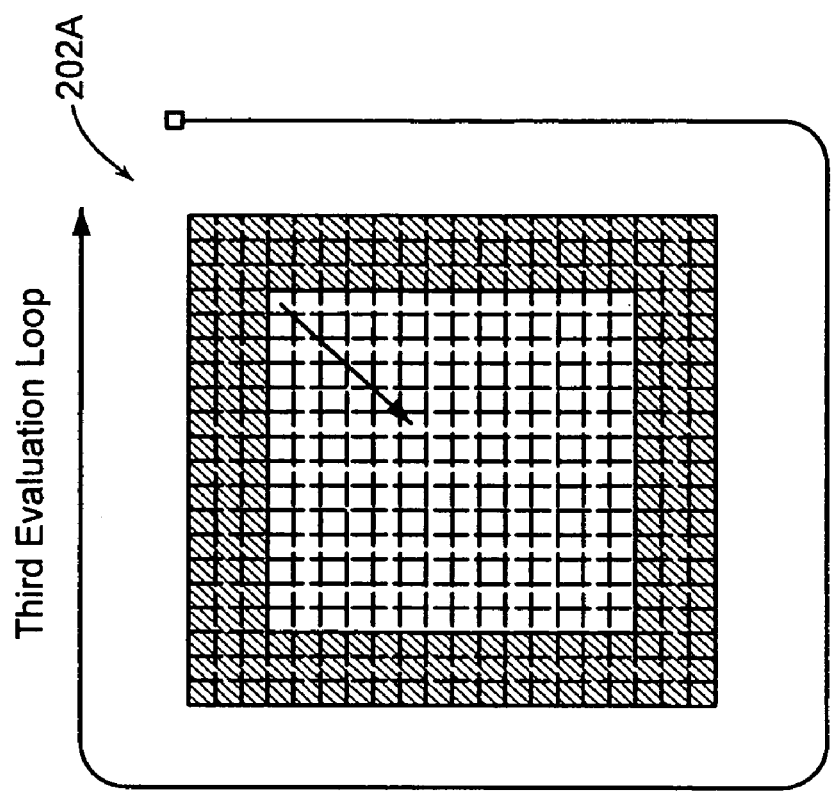
Figure 3B:
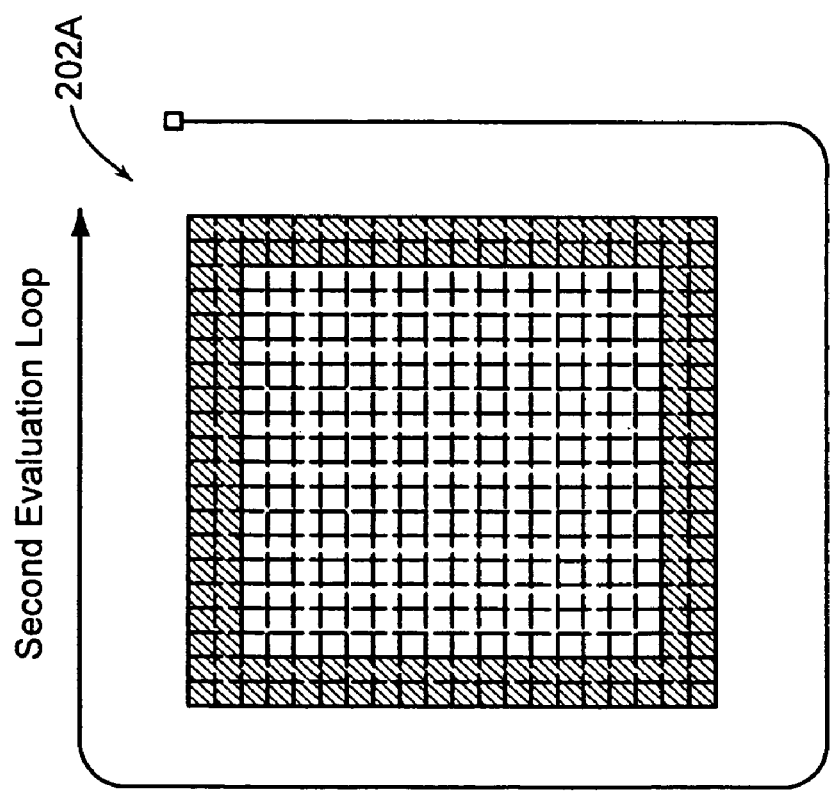

If the process completes a clockwise loop around the outer edge of region 202A without encountering a changed pixel, a new evaluation loop is commenced in a clockwise direction using the adjacent pixels within region 202A. FIG. 3B illustrates a completed second evaluation loop for region 202A and FIG. 3C illustrates the completion of a third evaluation loop for region 202A.

Methods making use of neighboring regions may be employed in conjunction with evaluating a pixel along a border within a region being processed. For example, a method may be configured such that detection of a changed pixel along the border region of 202A causes the pixels of region 202A as well as the pixels contained within a neighboring region to be transferred to a receiving computer. The method may further be configured such that detection of a changed pixel along the border of a region causes the pixels for the region under review to be transmitted as well as causing pixels associated with every region bordering, or touching, the region under review to be transmitted to receiving computer 112. Methods employing border pixels and neighboring regions may be developed for use on specific types of display data. For example, if a particular display application typically contains data having changes spanning borders, computer-executable code may be employed for processing border pixels in an efficient manner so as to facilitate fast processing. In particular, the method may start with the borders most likely to contain changed pixels before progressing to other pixels within a given region or within other regions of the display.

Figure 4A:
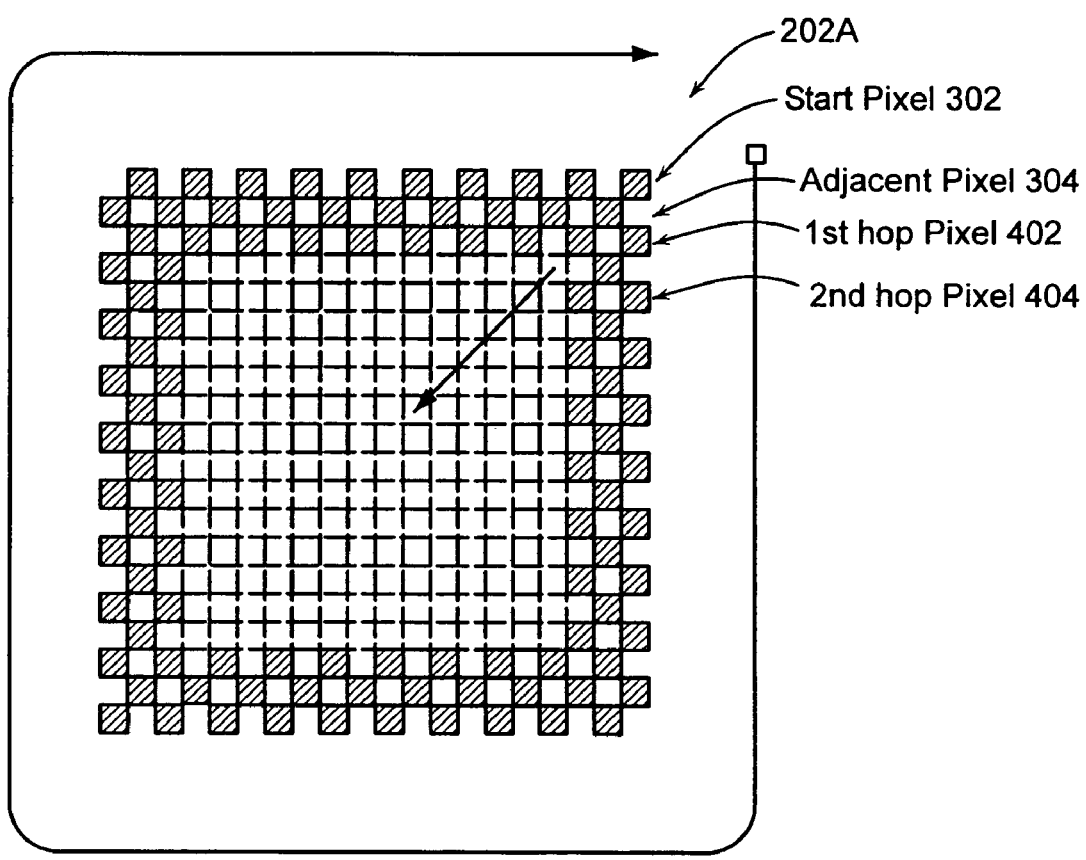
FIGS. 4A–4B illustrate exemplary methods for evaluating pixels within a region in accordance with aspects of the present invention.

FIG. 4A illustrates an alternative method for performing evaluation loops on pixels contained within a region, here again 202A. In FIG. 4A, start pixel 302 remains the same and is evaluated in the manner described in conjunction with FIG. 3A. However, if no changes are detected with respect to start pixel 302, the adjacent pixel 304 is skipped and the next pixel herein referred to as first hop pixel 402 is evaluated. If no changes are detected when the current value of first hop pixel 402 is compared to its baseline value, second hop pixel 404 is evaluated. In the alternative embodiment of FIG. 4A a tradeoff is made between the resolution afforded by evaluating every pixel and a doubling of speed, which is achieved by skipping every other pixel.

Methods employing one or more skipped pixels may be employed to further increase processing speed and system throughput. Although a single hop embodiment was described in conjunction with FIG. 4A, the invention is not limited thereto. Embodiments skipping a fixed number of multiple pixels per hop may be utilized as well as embodiments in which varying numbers of pixels are skipped on subsequent hops. Determining the number of pixels to skip as well as determining which pixels should be sampled is facilitated using computer-executable code. Furthermore, the determinations may be based on the likelihood that pixels within a particular portion of a region will change, based on likelihood that a particular region will change, as well as based upon other parameters such as display area, resolution of displayed images, frequency of image updates, network bandwidth, processing power, and the like. Methods employed in embodiments of the invention may further be designed to efficiently select the best region to evaluate for occurrences of changed pixels as well as to ensure that comparisons between a displayed region and stored region are performed efficiently. In addition, pixel skipping methods may be designed so that more than a single pixel change is required to cause the transmission of all pixels associated with a region. Requiring more than a single changed pixel ensures that pixel skipping methods will operate in a predictable and efficient manner without causing unnecessary transfers of pixels to a receiving computer. Pixel skipping methods may be turned off by an operator when conventional adjacent pixel processing is desired.

Figure 4B:
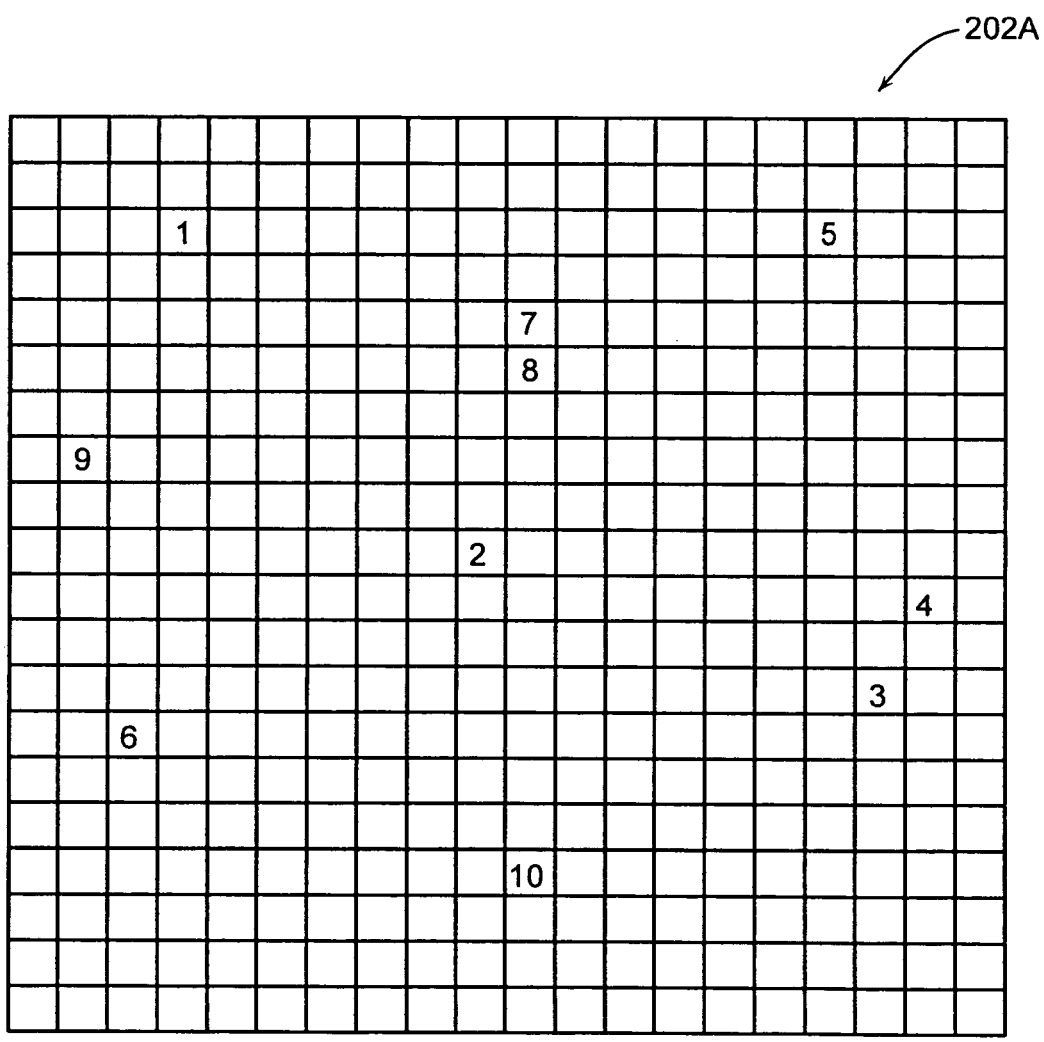

FIG. 4B illustrates yet another alternative embodiment for evaluating pixels within a region, here again region 202A. The methods for evaluating pixels discussed in conjunction with FIGS. 3A and 4A began with a pixel on an outer edge of region 202A and progressed with inwardly spiraling loops until a changed pixel was encountered. In contrast, the method illustrated in FIG. 4B utilizes a random number generator for choosing pixels within region 202A. The numbers within the pixels of FIG. 4B denote the order in which randomly chosen pixels were evaluated. For example, pixel 1 was selected and evaluated first, then pixel 2, etc. The pixels continue to be randomly selected until a changed pixel is encountered. When a changed pixel is encountered, host computer 102 sets the region-changed flag for region 202A and then transmits the current values for pixels comprising region 202A to receiving computer 112 via network 110.

Figure 5A:
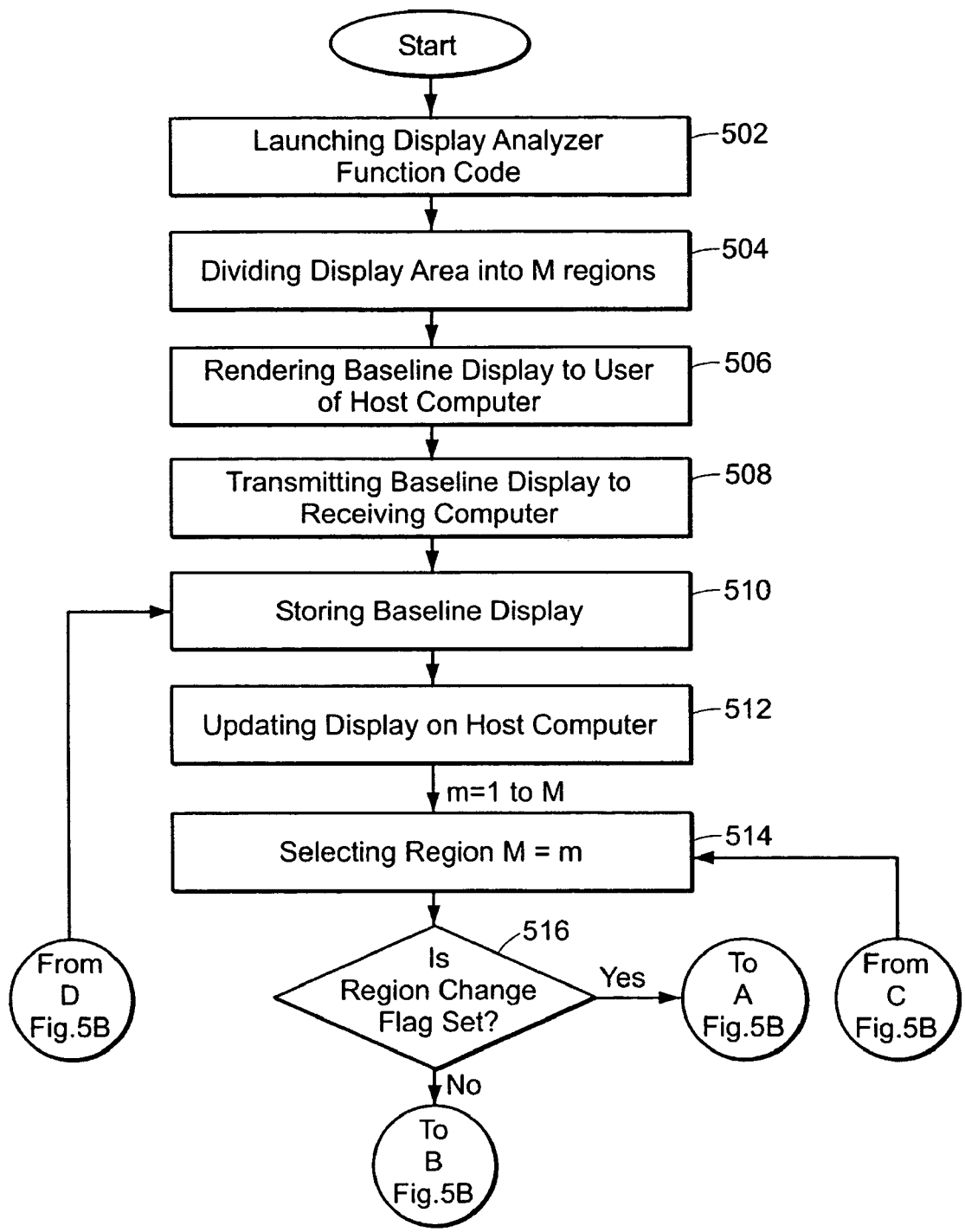
FIGS. 5A–5B illustrate an exemplary method for performing application sharing in accordance with a preferred embodiment of the invention.
Figure 5B:
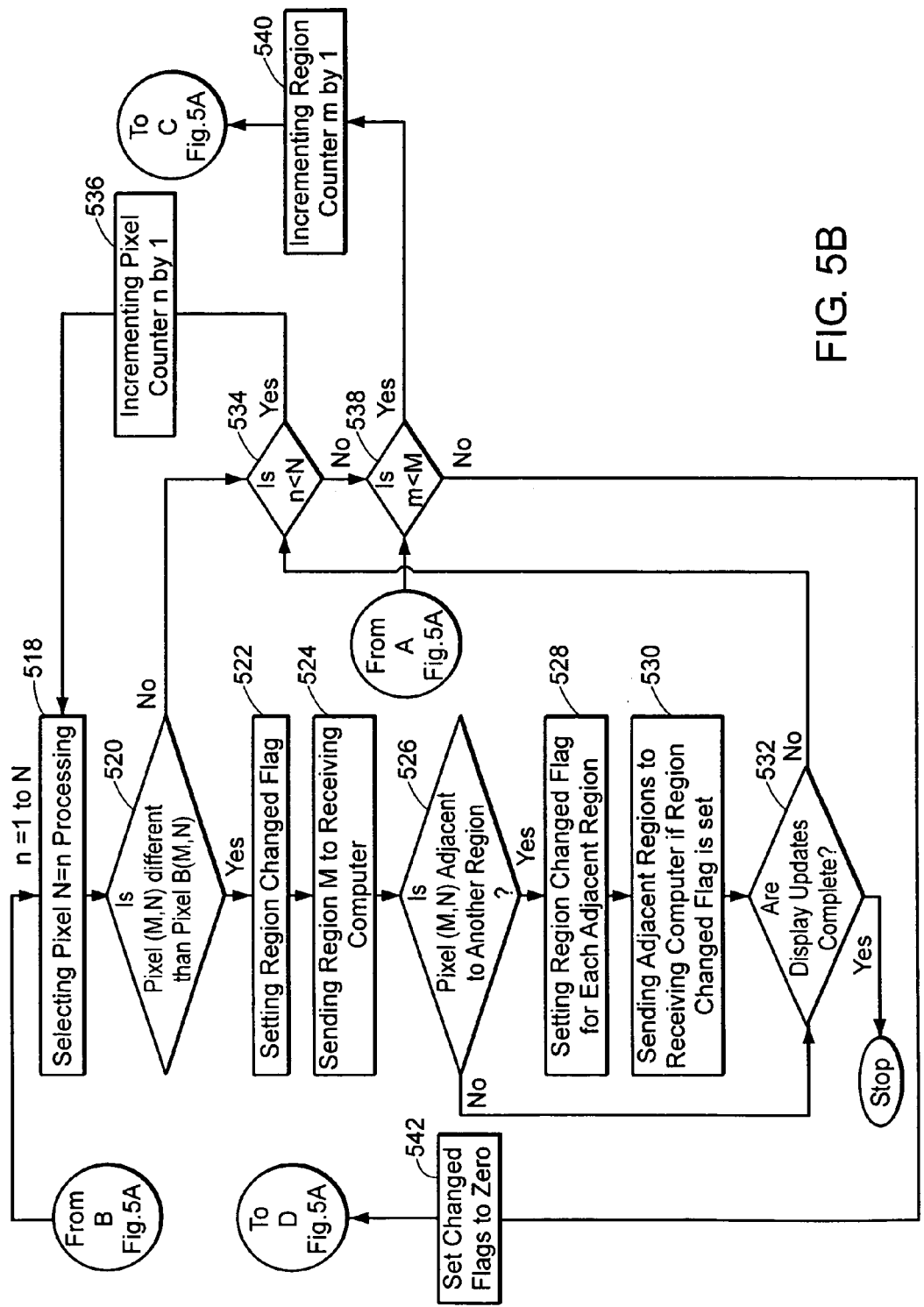

FIGS. 5A and 5B illustrate an exemplary method for performing display sharing between an host computer 102 and a receiving computer 112 in accordance with a preferred embodiment of the invention. The method begins when the display-sharing function-executable code is activated on host computer 102 per step 502. Display area 200 is divided into a predefined number of regions, here denoted by M where M can be any integer per step 504. A baseline image is rendered on host display 104 per step 506.

Coincident with rendering the baseline image on host display 104, the image is transmitted to receiving computer 112 for display on receiving display 114 via network 110 per step 508. The host computer 102 then stores the baseline image per step 510. The baseline image on host display 104 is updated with a new image, referred to as the current image, per step 512. A starting region is selected from the M total regions into which display area 200 was previously divided per step 514 using a region counter "m". An evaluation is made to determine if the region-changed flag is set for the starting region per step 516. If the region-changed flag is set, the respective region has already been evaluated such that a change of at least one pixel has occurred with respect to the baseline region stored in memory. And, as a result, that region does not have to be re-evaluated until the display area 200 is again updated. If the region-changed flag is set, process flow goes to step 538 discussed hereinbelow. In contrast, if the region-changed flag is not set, process flow goes to step 518 of FIG. 5B.

In FIG. 5B, the first pixel is selected from N available pixels in a region per step 518. An evaluation is made to determine if a particular pixel (N) from within region (M), here denoted as pixel(M,N) has changed with respect to the value of that pixel as contained in the stored baseline image, here given as B(M,N) per step 520. If pixel(M,N) has changed with respect to B(M,N), the region-changed flag is set for the region currently being evaluated per step 522.

In contrast, if pixel(M,N) has not changed relative to B(M,N), an evaluation is made to determine if pixel(N) is less than the total number of pixels within the region (M), per step 534. If pixel counter "n" is less than N, indicating that the last pixel within the region has not yet been analyzed, the pixel number is incremented by one, per step 536, and the flow returns to step 518. Returning to the primary data flow at the output of step 522, pixels within the changed region are sent to receiving computer 112 per step 524.

The method may next determine if pixel(M,N) is adjacent to another region per step 526. If another region is adjacent to pixel(M,N), then the region-changed flag for every adjacent region may be set per step 528. It may be desirable to set flags for adjacent regions in applications where it is likely that a changed pixel proximate to an outer edge of a region under examination will likely be part of a series of changed pixels spilling into adjacent regions. Adjacent regions are then sent to receiving computer 112 over network 110 per step 530. Returning to step 526, if pixel(M,N) is not adjacent to another region, the method flows to step 532. In step 532, an evaluation is made to determine if display updates are complete. If display updates are complete, host computer 102 no longer has to send updated regions to receiving computer 112, and therefore the method can terminate.

Referring now to step 534, if n is not less than the total number of pixels in the region under review, it indicates that the evaluated pixel is the last pixel in the respective region, and therefore n no longer has to be incremented for that region. When this condition occurs in step 534, flow goes to step 538. In step 538, an evaluation is performed to determine if m is less than M, the total number of regions in display 200. If m is less than M, it indicates that the highest numbered region within display area 200 has not been reached. When this occurs, m is incremented by 1 per step 540 before the method flow returns to step 514 and begins evaluating the next region in display area 200. If m is not less than M, the final region of display area 200 has been reached. When this occurs, the region-changed flags are reset to zero per step 542 before flow returns to step 510 where the current display area 200 on host computer 102 is stored and becomes the baseline display against which the next updated display area 200 is compared. After the display area 200 is updated with a new image, the method again operates on each region beginning with step 514 as previously described to determine if any pixels have changed value. When the display area 200 is updated, the prior image serves as the baseline image for comparison to the newly displayed image.

Figure 6:
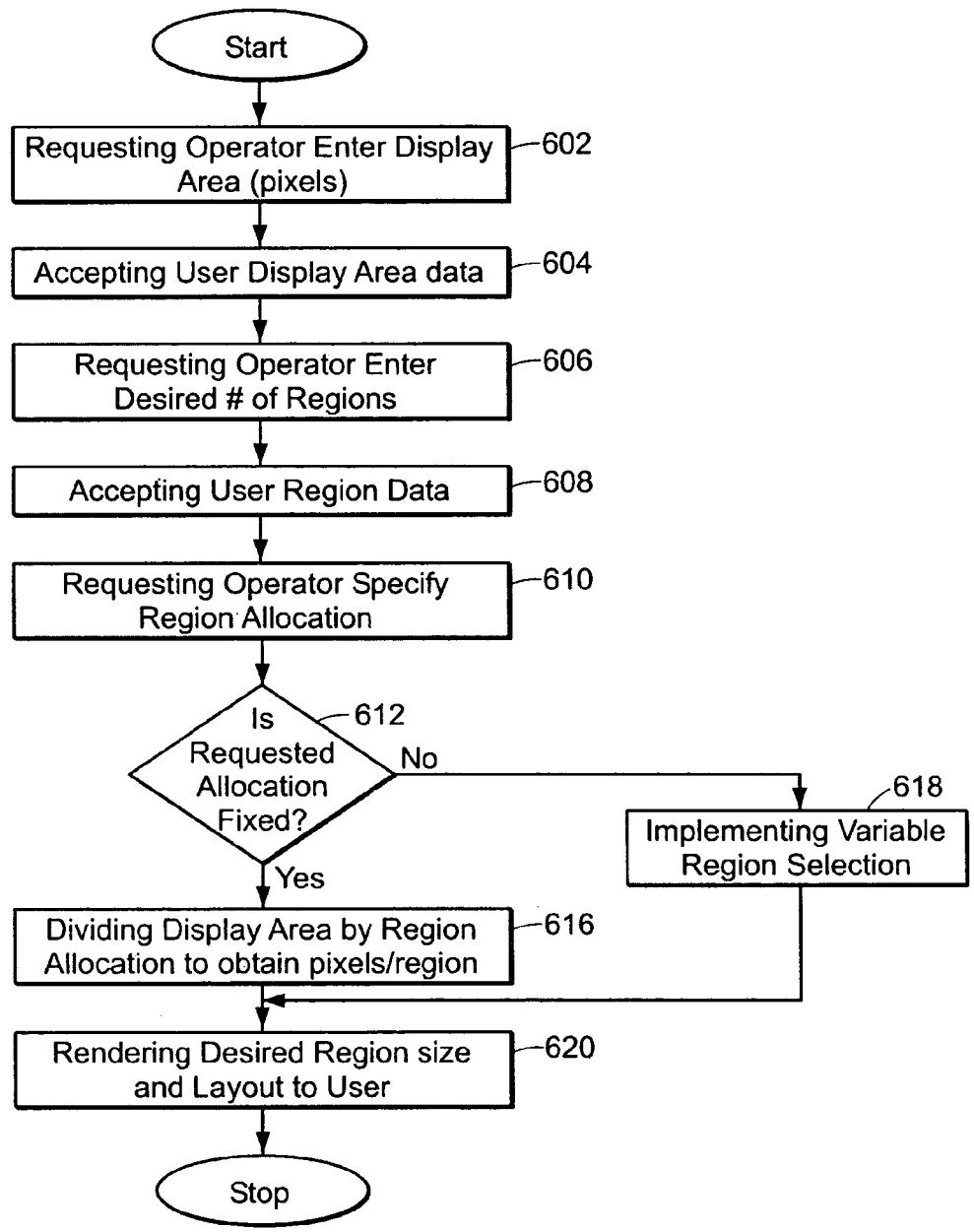
FIG. 6 illustrates an exemplary method for defining region layouts for application-sharing environments in accordance with aspects of the invention.

FIG. 6 illustrates a method for dividing a display area into a number of regions in accordance with an embodiment of the invention. The method of FIG. 6 may be implemented in connection with step 504 of FIG. 5A. When the method of FIG. 6 is executed by way of machine-readable instructions associated with a digital processor operating in host computer 102, a user is asked to input the display area 200 in terms of pixels per step 602. In an alternative embodiment of the invention, not shown in FIG. 6, host computer 102 can automatically determine the display area without user involvement. Returning to FIG. 6, host computer 102 display area data is entered by a user thereof per step 604. Host computer 102 may then ask the user to input a desired number of regions per step 606. Host computer 102 accepts the region data per step 608 and requests that the user identify the allocation of regions per step 610. By way of example, a user may specify that all regions are sized equally, such as shown in FIG. 2A, or that regions around the outer edge of display area 200 are a first size, while regions closer to the middle of the display area 200 are a second size, such as shown in FIG. 2B.

Host computer 102 may determine if the user requested an allocation of regions that was fixed in size, as discussed above, per step 612. If the regions are of a fixed size, the display area 200 may be divided into the proper number and sized regions per step 616. In contrast, if the user requests an allocation that is not fixed, host computer 102 may implement a variable, or adaptive, region specification and selection method per step 618. For example, host computer 102 may execute machine-executable instructions causing it to monitor a series of updated images in order to identify portions of display area 200 having the highest incidence of change. And, based on the results, host computer 102 may adaptively change the sizes of regions within display area 200 such that the display areas encountering frequent updates are sized in a manner optimizing the amount of image data sent over network 110. After step 616, or step 618, the desired region size is rendered to the user per step 620.

Figure 7:
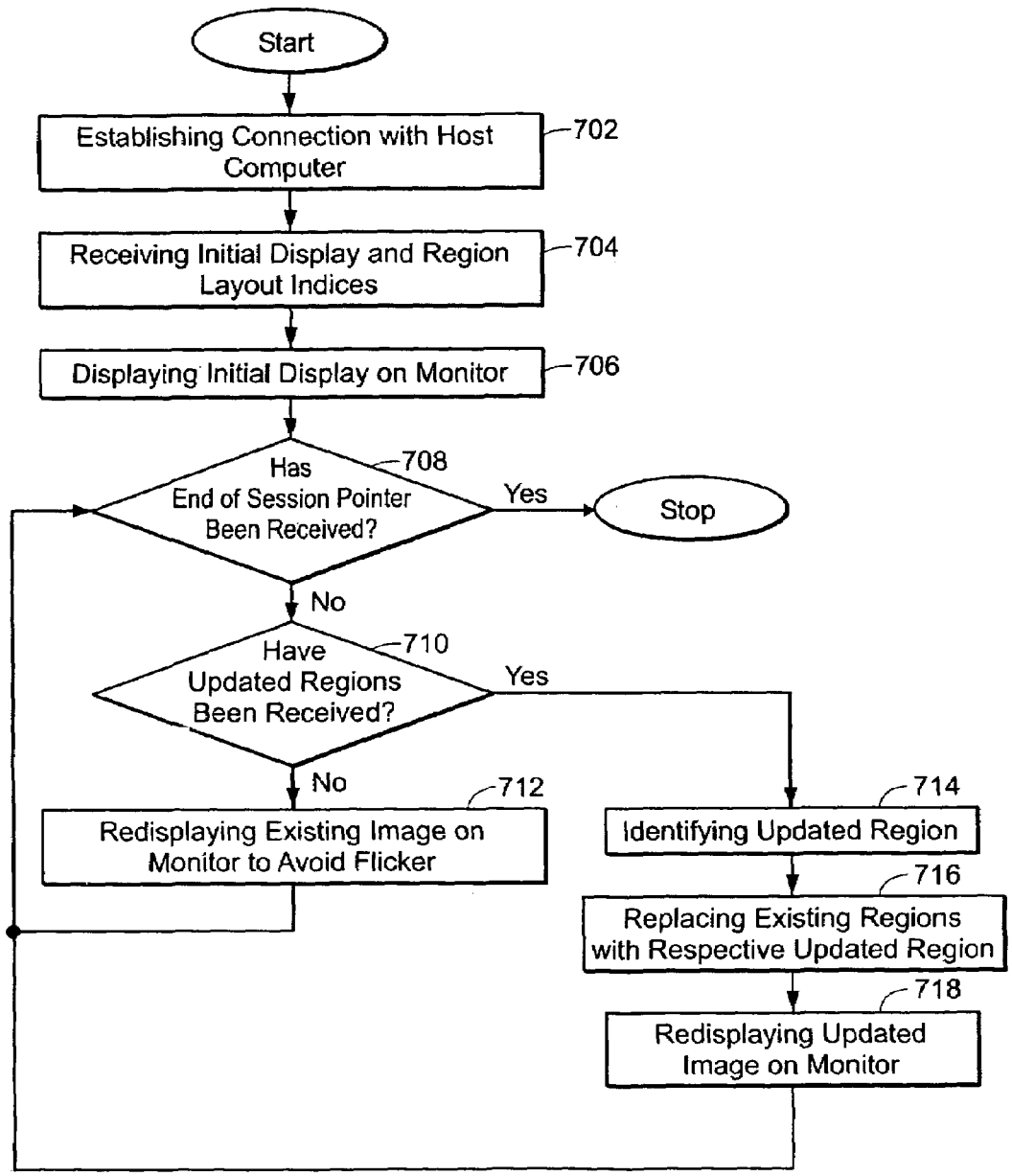
FIG. 7 illustrates an exemplary method operating in conjunction with a receiving computer used in an application-sharing environment in accordance with aspects of the invention.

FIG. 7 illustrates an exemplary method operating on a receiving computer enabling it to share applications and images in accordance with embodiments of the invention. Receiving computer 112 establishes a connection with host computer 102 by way of network 110 per step 702. An initial, or baseline, display along with region layout indices are received from host computer 102 per step 704. The baseline display data is displayed on receiving display 114 per step 706.

Receiving computer 112 then determines if an end-of-session pointer has been received from host computer 102 per step 708. An end-of-session pointer may be used by host computer 102 as an efficient mechanism for notifying receiving computer 112 that no additional regions will be sent. The end-of-session pointer may be generated in conjunction with step 532 wherein a determination is made that all display updates are complete. If an end-of-session pointer has been received, operation terminates. In contrast, if no end-of-session pointer is received at step 708, host computer 102 determines if updated regions have been received per step 710.

If no updated regions have been received, the existing image present on display device 200 is redisplayed at a refresh rate sufficient to avoid perceptible flicker by a user thereof per step 712. After step 712, the method returns to step 708 where a check for an end-of-session pointer is made. Returning to step 710, if update regions have been received, those updated regions are identified per step 714. When updated regions are identified, the region number and location within display area 200 are determined. The updated regions are used to overwrite existing regions having the same identifier, respectively, per step 716. The updated image is then displayed on receiving display 114 per step 718. After step 718, the method returns to step 708 where the method determines if an end-of-session pointer has been received from host computer 102.

Figure 8:
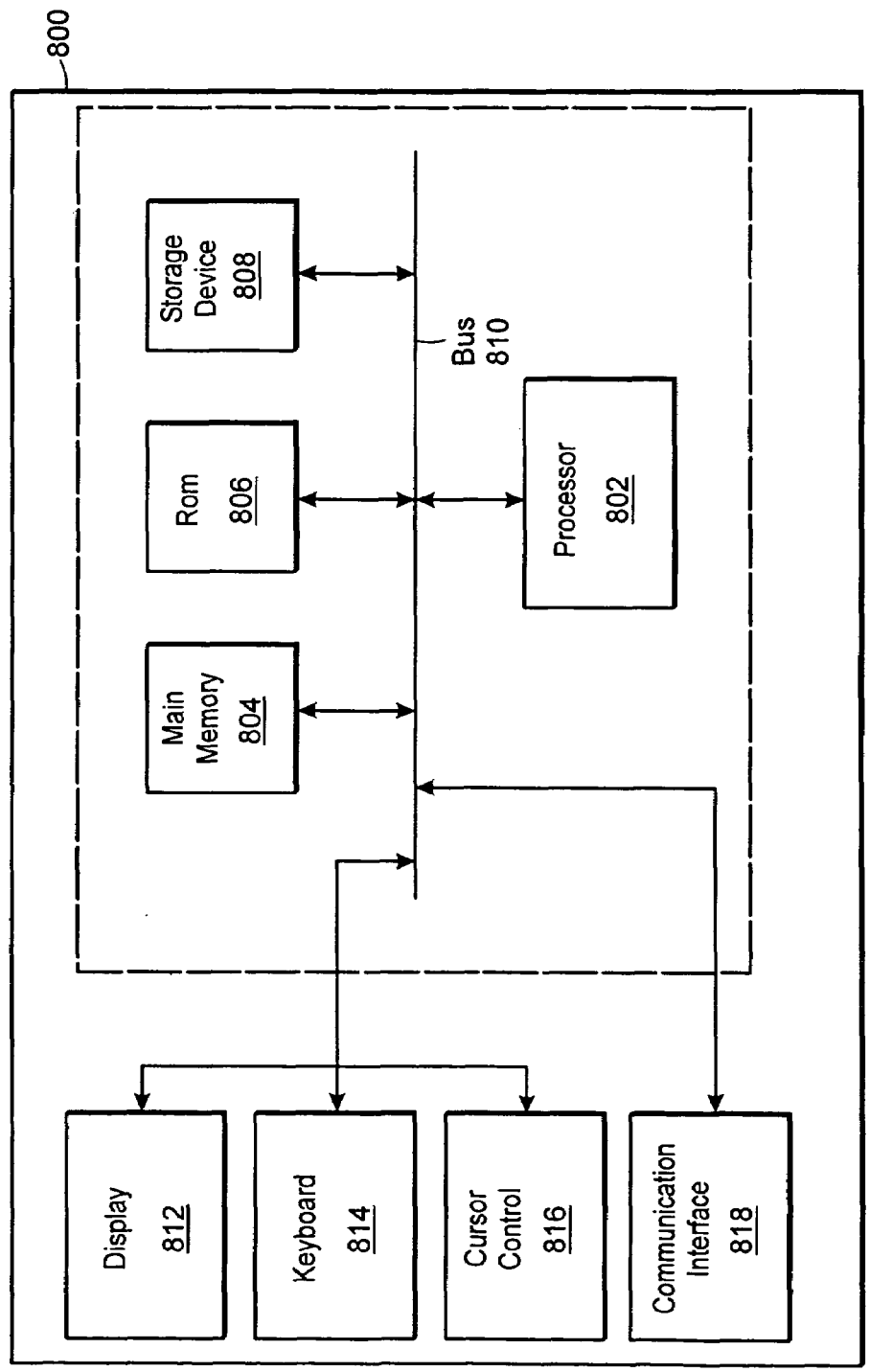
FIG. 8 illustrates an exemplary architecture for a general purpose computing device adaptable for use in an application-sharing environment in accordance with aspects of the invention.

FIG. 8 illustrates an exemplary general purpose computing device that is adaptively modifiable using computer-readable instructions and hardware to perform operations associated with host computer 102, receiving computer 112, or network 110.

General purpose computer 800 may be comprised of a processor 802, main memory 804, read only memory (ROM) 806, storage device 808, bus 810, display 812, keyboard 814, cursor control 816, and communication interface 818. Processor 802 may be any type of conventional processing device that interprets and executes instructions. Main memory 804 may be a random access memory (RAM) or a similar dynamic storage device. Main memory 804 stores information and instructions in machine-readable form for execution by processor 802. Main memory 804 may also be used for storing temporary variables or other intermediate information during execution of instructions by processor 802. It will be appreciated that ROM 806 may be replaced with other types of static storage devices such as programmable ROM, erasable programmable ROM, and the like. Data storage device 808 may include any type of magnetic or optical media and its corresponding interfaces and operational hardware. Data storage device 808 stores information and instructions for use by processor 802. Bus 810 includes a set of hardware lines (conductors, optical fibers, or the like) that allow for data transfer among the components of computer 800.

Display device 812 may be a cathode ray tube (CRT), liquid crystal display (LCD), or the like, for displaying information to a user. Keyboard 814 and cursor control 816 allow the user to interact with computer 800. Cursor control 816 may be; for example, a mouse. In an alternative configuration, keyboard 814 and cursor control 816 can be replaced with a microphone and voice recognition means to enable the user to interact with computer 800.

Communication interface 818 enables computer 800 to communicate with other devices/systems via any communications medium. For example, communication interface 818 may be a modem, an Ethernet interface to an IP network, or a printer interface. Alternatively, communication interface 818 can be any other interface that enables communication between computer 800 and other devices or systems.

By way of example, host computer 802 may store a baseline display in main memory 804 prior to processing one or more regions of a current display using processor 802. If a changed pixel is detected within one or more of the regions, communication interface 818 may transmit those regions to receiving computer 112 using network 110.

FIG. 9 illustrates an exemplary computer-readable data structure 900 capable of storing information related to application sharing of display data in accordance with embodiments of the invention. Data structure 900 may comprise region identifier field 902, update field 904, change-flag field 906, sent field 908, error field 910, and counter field 912. Region identifier field 902 may contain alphanumeric identifiers for uniquely referencing any number of regions comprising display area 200. Update field 904 may comprise values associated with flags used for denoting when pixels comprising a respective region have been updated. By way of example, a 1 may denote that a pixel in the respective region has been updated, while a 0 indicates that a region is comprised of baseline pixels.

Changed-flag field 906 may comprise flags for denoting when at least one pixel within a respective region has been updated with respect to a baseline pixel for that same region. By way of example, a changed-flag field 906 having a value of 1 may signify that a pixel has changed relative to a baseline pixel, while a 0 indicates either that a pixel has not changed or that the respective region has not yet been analyzed. Sent field 908 may be used to indicate if changed pixels associated with a respective region have been sent to receiving computer 112. Error field 910 may be used to track errors associated with the generation of system 100 and counter field 912 may be used to keep track of how many times pixels associated with a particular region have been sent from host computer 102 to receiving computer 112.

While selected preferred embodiments have been described herein; the invention is not limited thereto. In fact, an application-sharing system consistent with the invention may take many forms. For example, in a first alternative embodiment, the method of FIGS. 5A and 5B may be modified in that each pixel is not individually compared against its predecessor. In the first alternative embodiment, a hash value representative of the values of each pixel within a row of a baseline region may be computed. Then a hash value for the same row can be computed for an updated region on host computer 102. If the two hash values are different, then at least one of the updated pixels within the row has changed value relative to its corresponding pixel in the baseline display. The updated region can then be sent to receiving computer 112. Or, alternatively, the hash values associated with each updated row can be sent over network 110 and deciphered using a known key on receiving computer 112 to produce the correct values for each updated pixel in the row.

In a second alternative embodiment, host computer 102 and/or receiving computer 112 may be implemented in a distributed or parallel architecture. By way of example, if host computer 102 were a distributed architecture, processor 802 may be located proximate to display 812, while storage device 808 is located at a remote location and coupled to processor 802 by way of network 110 and communication interface 818.

In a third alternative embodiment, both host computer 102 and receiving computer 112 may act as both host and receiver simultaneously. In this embodiment, host computer 102 may send regions to receiving computer 112 while at essentially the same time receiving updated regions from receiving computer 112. This third embodiment may be present in networked video games where a user at either location can add data to or manipulate data in a displayed image.

In a fourth alternative embodiment, host computer 102 may be an enterprise management application, such as, for example, Lotus Notes™ developed and marketed by IBM Corporation. Enterprise management applications are used to support work force collaboration and communication. As such, host computer 102 may communicate with receiving computer 112 as part of a video conferencing capability.

And, in this capacity, host computer 102 may transmit updated regions to receiving display 114.

The claims should not be read as limited to the described order or elements unless stated to that effect. Therefore, all embodiments that come within the scope and spirit of the following claims and equivalents thereto are claimed as the invention.

What is claimed:

1. A method for sharing an application operating on a host computer operatively coupled to a network, said method comprising the steps of:
    parsing a display area comprising a plurality of pixels each having a value associated therewith into two or more regions to produce a divided display area wherein each region of said divided display area contains a subset of said plurality of pixels;
    determining if members of said subsets of said plurality of pixels differ from a like number of associateable subsets each having a like plurality of members consisting of associateable pixels each having a stored-value and further stored in a memory,
    comparing one of said pixels within each of said subsets of said display area to its respective associateable pixel stored in said memory, said one of said pixels from each subset of said display area being a selected pixel located adjacent to another of said two or more regions of said display area; and
    transferring those of said adjacent regions which border said selected pixel if said selected pixel has a value that differs from said value of said respective associateable pixel and displaying the transferred pixels on a receiving computer at a remote location.

2. The method of claim 1 wherein said parsing step involves dividing said display area into two or more regions of equal size such that each of said two or more regions contain the same number of pixels.

3. The method of claim 1 wherein said parsing step involves dividing said display area into two or more regions of variable size such that a first one of said two or more regions contains fewer pixels than other of said two or more regions.

4. A computer-readable medium containing machine-readable instructions for instructing a processor to perform operations for sharing an application over a network, said computer-readable medium comprising:
    instructions for parsing a display area into two or more regions producing a divided display area;
    instructions for applying said divided display area to a first display comprising a first plurality of pixels each having a first value associated therewith, said applying producing two or more first display regions each containing a subset of said first plurality of pixels;
    instructions for storing said two or more first display regions in a memory communicatively associated with a host computer;
    instructions for loading an updated display comprising a like plurality of pixels, each member of said like plurality having a second value associated therewith and further being associateable with a member of said first plurality, respectively;
    instructions for applying said divided display area to said updated display producing two or more updated display regions each containing a subset of said like plurality, each updated display region further associated with one of said first display regions;
    instructions for selecting one of said updated display regions producing a selected region;
    instructions for processing said selected region to determine if said second value associated with at least one of said subset of said like plurality differs from said first value associated with said associateable member(s) of said first plurality;
    instructions for comparing a pixel from said subset of said like plurality contained within said selected region to said associateable member of said first plurality, said pixel is located adjacent to another of said two or more undated disolay regions;
    instructions for selecting an adjacent pixel within said selected region if said comparing determines that said pixel and said associateable member of said first plurality are the same; and
    instructions for transferring those of said adjacent regions which border said selected pixel if said selected pixel has a value that differs from said value of said respective associateable pixel.

5. The computer-readable medium of claim 4 wherein said instructions for processing further comprise:
    instructions for comparing a pixel from said subset of said like plurality contained within said selected region to said associateable member of said first plurality.

6. A method for sharing an application operating on a host computer operatively coupled to a network, said method comprising the steps of:
    parsing a display area into two or more regions producing a divided display area;
    applying said divided display area to a first display comprising a first plurality of pixels each having a first value associated therewith, said applying further producing two or more first display regions each containing a subset of said first plurality of pixels;
    storing said two or more first display regions in a memory communicatively associated with said host computer;
    loading an updated display comprising a like plurality of pixels, each member of said like plurality having a second value associated therewith and further being associateable with a member of said first plurality, respectively;
    applying said divided display area to said updated display producing two or more updated display regions each containing a subset of said like plurality, each updated display region further associated with one of said first display regions;
    selecting one of said updated display regions producing a selected region;
    processing said selected region to determine if said second value associated with at least one of said subset of said like plurality differs from said first value associated with said associateable member(s) of said first plurality; and
    comparing a pixel from said subset of said like plurality contained within said selected region to said associateable member of said first plurality, said pixel is located adjacent to another of said two or more undated display regions;
    selecting an adjacent pixel within said selected region if said comparing determines that said pixel and said associateable member of said first plurality are the same; and
    transferring those of said adjacent regions which border said selected pixel if said selected pixel has a value that differs from said value of said respective associateable pixel.

7. The method of claim 6 wherein said parsing step involves dividing said display area into two or more regions of equal size such that each of said two or more regions contain the same number of pixels.

8. The method of claim 6 wherein said parsing step involves dividing said display area into two or more regions of variable size such that a first one of said two or more regions contains fewer pixels than other of said two or more regions.

9. The method of claim 6, wherein said processing step further comprises:

selecting every other pixel within said selected region and comparing it to its respective associateable member until a difference in value is detected.

10. The method of claim 6, wherein those of said updated display regions adjacent to said pixel are sent to a receiving computer if said second value differs from said first value.

* * * * *